(12) United States Patent
Kokott et al.

(10) Patent No.: US 10,781,876 B2
(45) Date of Patent: Sep. 22, 2020

(54) BRAKE DISK FOR VEHICLES

(71) Applicant: Bayerische Motoren Werke Aktiengesellschaft, Munich (DE)

(72) Inventors: Kordian Kokott, Karlsfeld (DE); Josef Hofstetter, Wimpasing (DE); Ulf Schulz, Berlin (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 28 days.

(21) Appl. No.: 16/014,913

(22) Filed: Jun. 21, 2018

(65) Prior Publication Data

US 2018/0306259 A1 Oct. 25, 2018

Related U.S. Application Data

(63) Continuation of application No. PCT/EP2016/077238, filed on Nov. 10, 2016.

(30) Foreign Application Priority Data

Dec. 22, 2015 (DE) .......................... 10 2015 226 449

(51) Int. Cl.
*F16D 65/12* (2006.01)
*F16D 65/02* (2006.01)

(52) U.S. Cl.
CPC ......... *F16D 65/123* (2013.01); *F16D 65/125* (2013.01); *F16D 65/128* (2013.01);
(Continued)

(58) Field of Classification Search
CPC .... F16D 65/123; F16D 65/128; F16D 65/125; F16D 2065/1328; F16D 2200/0021;
(Continued)

(56) References Cited

U.S. PATENT DOCUMENTS 5,526,905 A 6/1996 Shimazu et al.
6,116,386 A * 9/2000 Martin .................. F16D 65/123
188/218 XL
(Continued)

FOREIGN PATENT DOCUMENTS

CN 101743410 A 6/2010
CN 201908979 U 7/2011
(Continued)

OTHER PUBLICATIONS

International Search Report (PCT/ISA/210) issued in PCT Application No. PCT/EP2016/077238 dated Jan. 24, 2017 with English translation (eight pages).
(Continued)

*Primary Examiner* — Pamela Rodriguez
(74) *Attorney, Agent, or Firm* — Crowell & Moring LLP

(57) ABSTRACT

A brake disk for a disk brake, which consists of a brake disk chamber and at least one friction ring connected to the brake disk chamber by rivets, wherein a jacket of the brake disk chamber is provided with sections having reduced wall thickness and/or through-holes, which are axially directed material cut-outs located on the outer periphery of the brake disk chamber jacket, which material cut-outs are used to at least partially place the axially directed rivets. The friction ring and the brake disk chamber are centered with respect to each other exclusively by the rivets. The friction ring has at least one fastening extension directed inward from the friction surface, to which fastening extension a collar of the brake disk chamber jacket is connected by the rivets in that the side of the friction ring directed toward the brake disk chamber has an axially directed depression for accommodating the collar of the brake disk chamber, which depression is designed in such a way that there is radial play between the brake disk chamber and the friction ring.

16 Claims, 2 Drawing Sheets

(52) U.S. Cl.
CPC .............. *F16D 2065/132* (2013.01); *F16D 2065/1316* (2013.01); *F16D 2065/1328* (2013.01); *F16D 2065/1344* (2013.01); *F16D 2065/1348* (2013.01); *F16D 2065/1392* (2013.01); *F16D 2200/003* (2013.01); *F16D 2200/0017* (2013.01); *F16D 2200/0021* (2013.01); *F16D 2200/0034* (2013.01); *F16D 2250/0061* (2013.01)

(58) Field of Classification Search
CPC ....... F16D 2200/0034; F16D 2200/003; F16D 2200/0017; F16D 2065/1344; F16D 2065/1392; F16D 2065/1348; F16D 2065/132; F16D 2250/0061
USPC ................ 188/218 XL, 218 R, 73.2, 264 A, 188/264 AA, 18 A; 301/6.1, 105.1
See application file for complete search history.

(56) References Cited

U.S. PATENT DOCUMENTS

| | | | |
|---|---|---|---|
| 6,302,246 | B1 | 10/2001 | Naumann et al. |
| 6,386,341 | B1 | 5/2002 | Martin |
| 6,997,292 | B2 * | 2/2006 | Burgoon ............... F16D 65/123 188/18 A |
| 8,651,247 | B2 * | 2/2014 | Burgoon ............... F16D 65/123 188/18 A |
| 9,174,274 | B2 * | 11/2015 | Hanna .................... B22D 19/00 |
| 2005/0269174 | A1 | 12/2005 | Lin |
| 2009/0139821 | A1 | 6/2009 | Koppitz et al. |
| 2010/0101902 | A1 | 4/2010 | Kano et al. |
| 2010/0230221 | A1 | 9/2010 | Biondo et al. |
| 2012/0073917 | A1 | 3/2012 | Lee |
| 2012/0125725 | A1 | 5/2012 | Tironi et al. |
| 2014/0224603 | A1 | 8/2014 | Kokott |
| 2016/0160948 | A1 | 6/2016 | Wagner et al. |
| 2018/0298966 | A1 * | 10/2018 | Kokott .................. F16D 65/123 |
| 2018/0298967 | A1 * | 10/2018 | Kokott .................. F16D 65/123 |

FOREIGN PATENT DOCUMENTS

| | | |
|---|---|---|
| CN | 102575735 A | 7/2012 |
| CN | 105065515 A | 11/2015 |
| CN | 204755671 U | 11/2015 |
| DE | 1 775 685 A | 9/1971 |
| DE | 198 59 840 A1 | 7/2000 |
| DE | 199 25 003 A1 | 12/2000 |
| DE | 100 32 972 A1 | 1/2002 |
| DE | 10 2006 028 771 A1 | 1/2008 |
| DE | 10 2008 051 598 A1 | 4/2010 |
| DE | 10 2009 046 051 A1 | 5/2010 |
| DE | 10 2009 017 234 A1 | 10/2010 |
| DE | 10 2009 037 817 A1 | 4/2011 |
| DE | 10 2011 101 126 B3 | 10/2012 |
| DE | 10 2011 084 946 A1 | 4/2013 |
| DE | 10 2013 215 997 A1 | 2/2015 |
| DE | 10 2013 225 538 A1 | 6/2015 |
| EP | 0 872 659 A1 | 10/1998 |
| EP | 1 260 728 A1 | 11/2002 |
| GB | 142 468 A | 7/1921 |
| JP | 6-129452 A | 5/1994 |
| JP | 2010-106916 A | 5/2010 |
| JP | 2012-72904 A | 4/2012 |
| WO | WO 2015/022126 A1 | 2/2015 |

OTHER PUBLICATIONS

German-language Written Opinion (PCT/ISA/237) issued in PCT Application No. PCT/EP2016/077238 dated Jan. 24, 2017 (five pages).

German-language Search Report issued in counterpart German Application No. 10 2015 226 449.1 dated Jun. 30, 2016 with partial English translation (12 pages).

International Search Report (PCT/ISA/210) issued in PCT Application No. PCT/EP2016/077236 dated Jan. 27, 2017 with English translation (seven pages).

German-language Written Opinion (PCT/ISA/237) issued in PCT Application No. PCT/EP2016/077236 dated Jan. 27, 2017 (five pages).

German-language Search Report issued in counterpart German Application No. 10 2015 226 450.5 dated Jun. 30, 2016 with partial English translation (11 pages).

International Search Report (PCT/ISA/210) issued in PCT Application No. PCT/EP2016/077234 dated Jan. 27, 2017 with English translation (eight pages).

German-language Written Opinion (PCT/ISA/237) issued in PCT Application No. PCT/EP2016/077234 dated Jan. 27, 2017 (five pages).

German-language Search Report issued in counterpart German Application No. 10 2015 226 451.3 dated Jun. 30, 2016 with partial English translation (12 pages).

Chinese-language Office Action issued in counterpart Chinese Application No. 201680075031.0 dated May 20, 2019 with English translation (17 pages).

Japanese-language Office Action issued in Japanese Application No. 2018-532762 dated May 20, 2020 with English translation (13 pages).

* cited by examiner

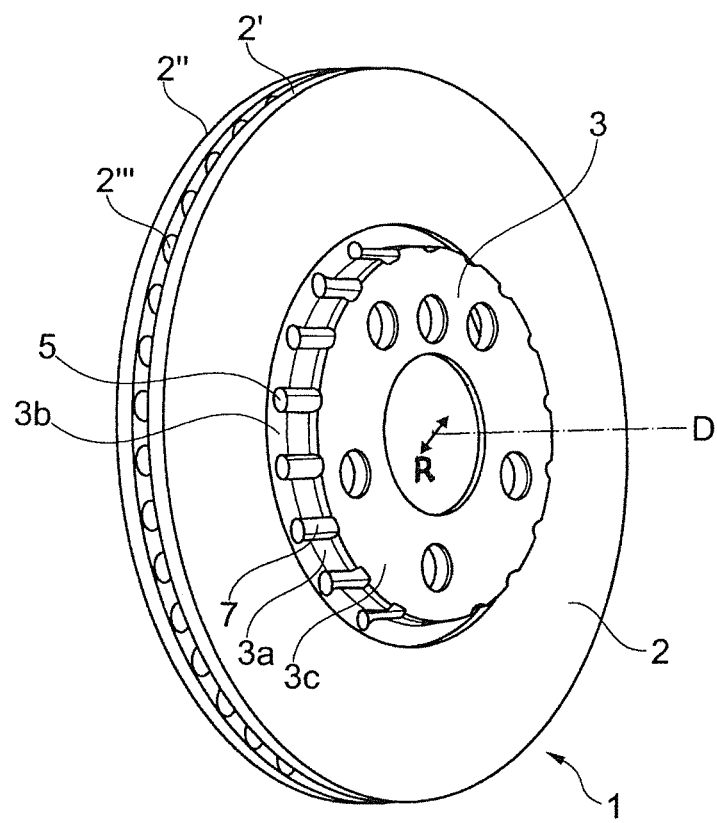
Fig. 1
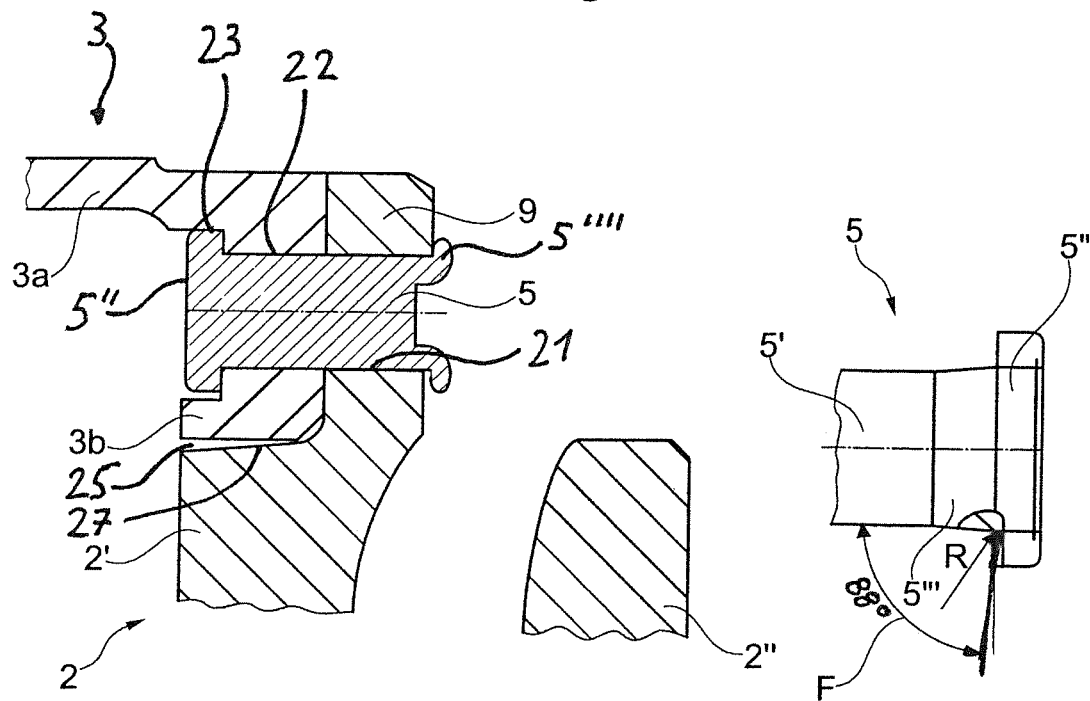
Fig. 2
Fig. 3

BRAKE DISK FOR VEHICLES

CROSS REFERENCE TO RELATED APPLICATIONS

This application is a continuation of PCT International Application No. PCT/EP2016/077238, filed Nov. 10, 2016, which claims priority under 35 U.S.C. § 119 from German Patent Application No. 10 2015 226 449.1, filed Dec. 22, 2015, the entire disclosures of which are herein expressly incorporated by reference.

This application contains subject matter related to U.S. application Ser. Nos. 16/014,946 and 16/014,958, entitled respectively "Internally Ventilated Brake Disk" and "Brake Disc for a Vehicle" filed on even date herewith.

BACKGROUND AND SUMMARY OF THE INVENTION

The invention relates to composite brake disks for motor vehicles. Brake disks are constituent parts of a motor-vehicle braking system which are installed coaxially with a wheel and have a friction ring and a brake-disk hub. The brake-disk hub here serves to fasten the brake disk on a wheel hub, whereas the friction ring is brought into tribological contact with the brake pads of the braking system during braking operation. This dissipates the kinetic energy of the motor vehicle in the form of friction heat, and the vehicle is braked.

Such brake disks can be produced in one or more parts, the material of the friction ring being subjected to the greatest amount of stress. Friction rings are therefore usually designed in the form of castings, in particular using GG-15 or GG-25. In order for the heat which is produced during braking operation to be dissipated from the friction ring, such friction rings are often configured in the form of internally ventilated friction rings, that is to say they are provided with channels or bores which have air flowing through them in order thus to improve the dissipation of heat from the friction ring.

Such a brake disk, in the case of which the friction ring or the (usually joined-together) friction rings is or are produced separately from the brake-disk hub and then connected thereto in a suitable manner, has the advantage that the friction ring(s), on the one hand, and the brake-disk hub, on the other hand, can be produced from the materials which are most suitable for the respective requirements. This means that for example, on the one hand, it is possible to achieve a reduction in weight and, on the other hand, advantageous decoupling between the friction ring and brake-disk hub is thus possible.

DE 100 32 972 A1 describes a composite brake disk, in the case of which the essentially conventionally formed brake-disk hub has a lateral surface which is circular and cylindrical in relation to the axis of rotation of the disk brake and in which through-passages or at least reduced-wall-thickness portions are provided. This brake-disk hub therefore has a certain elasticity which is beneficial for essentially unimpeded thermal friction-ring expansion, i.e. the unavoidable friction-ring expansion is thus not impeded to any significant extent by the brake-disk hub, and therefore stressing is not built up and undesirable friction-ring deformation is ruled out. The material proposed by said document for the brake-disk hub is a higher-strength steel material or the like.

It is an object of the present invention to provide a brake disk in the case of which a suitable connection between the friction ring and brake-disk hub allows the amount of space required for attaching the brake disk to the wheel hub to be kept small. In addition, the intention is to provide a connection between the brake-disk hub and friction ring which, when braking operation creates heat, builds up the lowest possible level of stressing in the brake disk and, in addition, can also transmit very high braking force.

This and other objects are achieved according to the invention by a brake disk for a disk brake, which comprises a brake-disk hub and at least one friction ring, which is connected to said brake-disk hub via rivets, wherein a lateral surface of the brake-disk hub is provided with reduced-wall-thickness portions and/or through-passages, which are axially directed material cutouts, which are located on the outer circumference of the lateral surface of the brake-disk hub and serve for the at least partial placement of the axially directed rivets. The friction ring and the brake-disk hub are centered in relation to one another exclusively via the rivets. The friction ring has at least one fastening extension, which is directed inward from the friction surface and to which a collar of the lateral surface of the brake-disk hub is connected by the rivets, that side of the friction ring which is directed towards the brake-disk hub having an axially directed depression, which is intended for accommodating the collar of the brake-disk hub and is configured such that an amount of radial play is present between the brake-disk hub and friction ring.

If, then, the internal diameter of the depression is greater than an external diameter of the collar, and therefore the friction disk is centered in relation to the brake-disk hub exclusively by the rivets, this has the advantage that, with it being possible for the support of the brake-disk hub on the friction disk to be machined to best possible effect, it is possible to provide a centering rivet connection between the two parts which, on the one hand, allows high braking forces to be transmitted and, on the other hand, as far as the transmission of heat from the friction disk to the brake-disk hub is concerned, provides for the best possible insulation effect with, at the same time, a high degree of freedom from warping. In addition, it is advantageous if the depression fully accommodates the collar of the brake-disk hub and/or if a bore for accommodating the rivet in the collar of the brake-disk hub, said bore corresponding to a bore in the fastening extension for accommodating the rivet, has a planar depression at its end which is directed away from the friction disk, said planar depression serving to accommodate the manufactured head of the rivet to some extent or to the full extent. The manufactured head and brake-disk-chamber collar thus form an essentially planar surface form, and the amount of dirt and brake-lining dust adhering can therefore be reduced.

It is thus advantageously possible for the extension of the friction-disk surface in the inward direction as far as the lateral surface of the brake-disk hub to be of essentially planar configuration. This makes it difficult for dirt to accumulate and for water to penetrate into the connection between the brake-disk hub and friction disk.

Centering of the brake-disk hub and friction ring in relation to one another exclusively via the rivets also has the advantage that, in case of heating and of different coefficients of expansion of the materials, it is not possible for stressing to occur on account of the two parts being otherwise fixed in relation to one another. In order for it to be possible to ensure an optimum contact pattern of the rivets, specifically in the relevant cross section, these should then be formed in a specific manner, with geometrical provision made in order to compensate for a force-transmission loss which occurs in standard rivets according to the prior art due to the latter, as they deform, forming a tapering barrel shape with a relatively poor contact pattern. Tests have shown that, during the operation of setting the rivet, a leading clearance directly at the manufactured head, for example a cone over a sub-region of the rivet stem, prevents the barrel shape brought about by the riveting process according to the prior art and optimizes the contact pattern of the rivet in the vicinity of the manufactured head. It is thus advantageous if, starting from a manufactured head, at least over a sub-region of its stem in the region of the brake-disk hub, each rivet, prior to being deformed, has a cone, of which the diameter decreases in the direction of a rivet-closing head.

Furthermore, the brake disk can advantageously be configured such that its friction ring has at least one fastening extension, which is directed inward from the friction surface and to which a collar of a lateral surface of the brake-disk hub is connected by the rivets. The fastening extension creates a support surface for the collar of the brake-disk hub, it being possible for said support surface, like the brake-disk hub prior to the joining operation, to be provided, for example by machine, with a surface quality which is advantageous for the joining pairing. The support surface for the collar of the brake-disk hub and friction ring can be optimized in terms of heat transmission such that the heat transmission, when the friction disk is heated, results in the lowest possible level of stressing in joining partners.

For this reason, an advantageous embodiment of the brake disk has indents on the internal diameter of the friction ring, on the depression thereof and support surface of the collar of the brake-disk hub, wherein a respective rivet is placed between the indents. In the case of a preferred embodiment, as seen in the radial direction, the indents have a maximum depth bounded by a reference circle of interconnected longitudinal axes of the rivets. They therefore extend as far as the rivet center point, obviously in a state in which they are offset in relation to the same circumferential direction.

Further advantageous embodiments of the invention provide for use to be made of an internally ventilated brake disk having two adjacent friction disks, which are connected to one another by radially running, regularly arranged webs, wherein the webs run from an outer-circumference periphery to an inner-circumference periphery of the friction disks, and the latter are connected by the webs such that the interspaces thereof form identically sized cooling channels through which cooling air can flow and which are subdivided by further, relatively shorter webs such that, in a radial region relatively close to the inner-circumference periphery of the friction disks, a respectively relatively shorter web is located centrally between the webs, and the relatively shorter webs project radially inward beyond the webs and extend as far as the fastening extension, where, in alignment therewith in the radially inward direction, a respective rivet connects the fastening extension to the collar.

This achieves an even more stable embodiments of the brake disk, which can transmit even more braking force, in particular when eighteen rivets are arranged at regular spacings on the reference circle for rivet-connection purposes.

According to further preferred embodiments of the invention, directed radially outward from the relatively shorter web, the cooling channels divide up into at least three flow channels, two first further relatively shorter webs being arranged in each cooling channel, in a state in which they are offset radially outward in relation to each relatively shorter web in the circumferential direction.

Such an arrangement and configuration of cooling channels between the friction disks gives rise to a high rib density. The higher this density, the greater the cooling surface area and therefore the better the extent to which it is possible to compensate for temperature peaks which occur, and this results in an optimized cooling of the brake disk. The cooling-channel arrangement, which increases the surface area provided for cooling the brake disk, thus advantageously enhances the cooling performance.

It is also advantageous if the friction disk which is directed towards the brake-disk hub is extended inwards in the direction of the fastening extension, and thus forms the latter.

Further advantageous embodiments of the invention are distinguished by the rivet geometry being further optimized. For example, a transition provided from the rivet stem to the manufactured head of the rivet is provided with an axial undercut on the manufactured head of the rivet. An undercut of 88 degrees between the rivet stem and the underside of the manufactured head of the rivet is preferred. Tests have shown that this even further optimizes the contact pattern between the rivet and brake-disk hub, and therefore the connection is suitable for an even greater amount of force transmission over a longer service life. This advantage is also increased, in addition, if the rivets consist of an austenitic, stainless steel. It is possible here for the brake-disk hub to consist of a light metal or of steel or of a non-metal material, that is to say suitable materials for the chamber are preferably higher-strength high-strength light metals (inter alia magnesium) or a high-strength, thin-walled sheet steel or aluminum and other non-ferrous or non-metal materials. The brake-disk hub can therefore be produced, for example, by casting or forging or by extrusion. If use is made of a brake-disk hub according to the invention made of a lightweight material, it is possible to use steel wheels in addition to aluminum wheels.

If the brake-disk hub and the friction ring are connected to one another by means of orbital riveting, it is possible for a surface pressure of the rivets even on the gray-cast-material of the friction ring to be kept to as low a level as possible.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a three-dimensional illustration of a brake disk according to an embodiment of the invention, with a view of the brake-disk hub.

FIG. 2 shows the brake disk according to FIG. 1 in an enlarged partial section (the section plane contains the axis of rotation), in a state in which it has been rotated in relation to FIG. 1 about a vertical axis located in the drawing plane, in the region where the friction disk is fastened on the brake-disk hub.

FIG. 3 shows a yet further-enlarged partial view of a rivet from FIG. 2 rotated through 180 degrees.

DETAILED DESCRIPTION OF THE DRAWINGS

Figure 4:
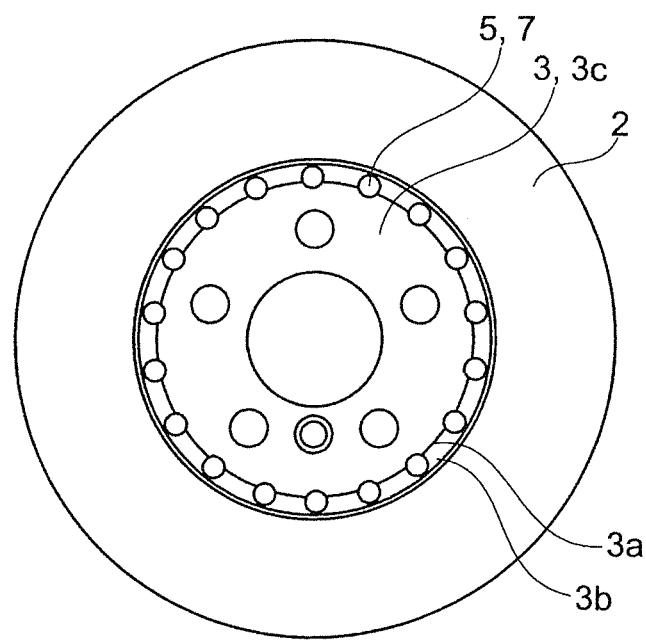
FIG. 4 is a plan view of the chamber side of the brake disk.

The brake disk 1 illustrated in the figures has a brake-disk hub 3 and a friction ring 2 and is provided for installation on a wheel hub (not shown) in order to rotate therewith, during operation, about the axis of rotation D. The single-piece, internally cooled friction ring 2, which is produced from gray cast iron, includes two friction disks 2', 2" with webs 2''' which are located therebetween, and connect the friction disks to one another, for cooling-air guidance. The annular friction disk 2', which is located closer to the brake-disk hub 3 in the axial direction, i.e. as seen in the direction of the axis of rotation D, extends radially R (as seen in relation to the axis of rotation D), by way of a so-called fastening extension 9, a certain amount further in the direction of the axis of rotation D than the other friction disk 2", which is further away from the brake-disk hub 3 in the axial direction.

In the region of overlap between the aforementioned fastening extension 9 of the friction disk 2' and a collar 3b, which projects outward in the radial direction R from the free end of the lateral surface 3a of the brake-disk hub 3, said lateral surface being circular-cylindrical in relation to the axis of rotation D, the brake-disk hub 3 is connected to the friction disk 2' and thus to the friction ring 2, via axially extending rivets 5. In this regard, the text here (and in particular in the introductory part of the description) refers to a connection between the brake-disk hub 3 and the friction ring 2.

In the lateral surface 3a of the brake-disk hub 3, and to some extent also in the base 3c of the brake-disk hub 3, cutouts 7 are distributed uniformly over the circumference of the brake-disk hub 3. The rivets 5 project into the cutouts, i.e. the rivets 5 are placed at least to some extent therein. Each of these cutouts 7, which also form reduced-wall-thickness portions 7, extends in the axial direction around the respectively associated, likewise oriented rivet 5 and serves to accommodate the latter to some extent and/or to accommodate the set rivet 5 during installation, i.e. the connection of the brake-disk hub 3 to the friction ring 2, as can be seen in the axial direction. The cutouts 7 here are essentially in the form of a semicircular cylinder and are formed in the lateral surface 3a of the brake-disk hub 3 during casting or forging, and therefore, although said lateral surface 3a is weakened in the region of the cutouts 7, it still forms a closed wall on the inside, i.e. as seen from the axis of rotation D. Of course, through-passages in the form of bores are also provided, pretty much as an extension to the cutouts 7, in the collar 3b of the brake-disk hub 3, and the rivets 5 are fitted through these. These cutouts 7 therefore allow the rivets 5 to be arranged closer to the axis of rotation D.

Figure 5:
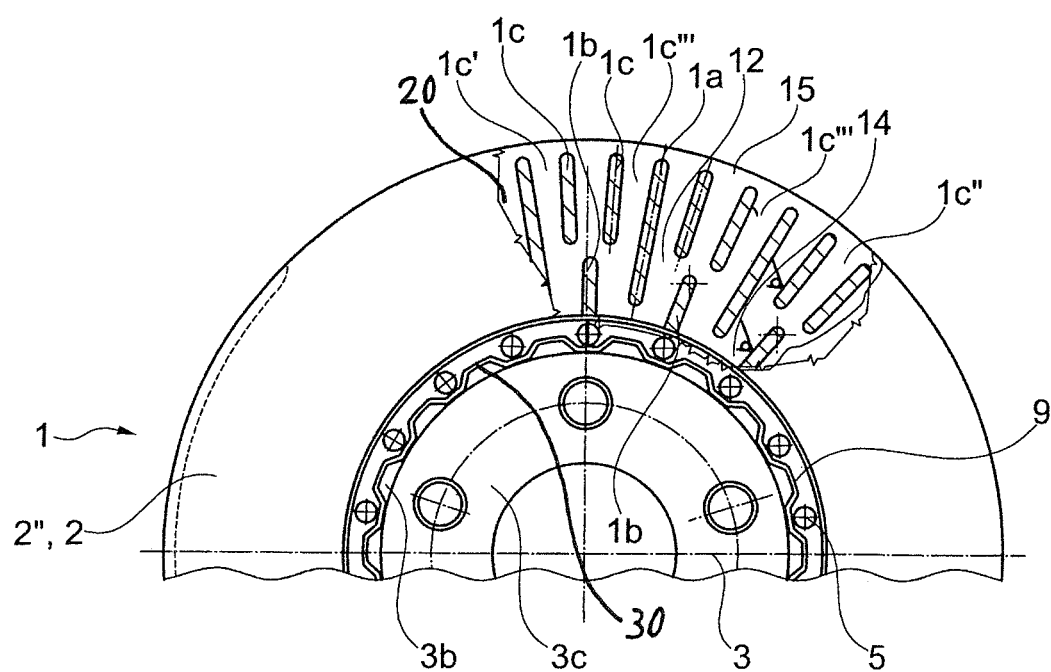
FIG. 5 is a plan view of part of the rear side of the brake disk rotated through 180 degrees in relation to FIG. 4, the connection between two friction disks via webs being illustrated by virtue of part of the friction disk being cut away.

FIG. 5 shows, on the inside of the friction disk 2' of the brake disk 1, a combination of webs 1a and relatively shorter webs 1b, 1c of the internally ventilated brake disk 1 which is repeated in a geometrically regular manner in the circumferential direction over the circular-ring surface of said friction disk. The friction disks 2', 2" of the friction ring 2 are connected to one another via the webs 1a and the relatively shorter webs 1b, 1c, wherein the webs 1a, at the same time, bound cooling channels 20, which are repeated in a likewise geometrically regular manner in the circumferential direction over the circular-ring surfaces of the friction disks 2', 2". The cooling channels 20 each extend from an inner-circumference periphery 14 of the friction disks 2', 2" at the beginning of the webs 1a as far as an outer-circumference periphery 15 of the friction disks 2', 2" of the brake disk 1.

As seen in the circumferential direction, centrally in each cooling channel 20 between the respectively equal-length webs 1a within the friction disks 2', 2", the shorter web 1b extends in each case from the vicinity of the inner-circumference periphery 14 of the friction disks 2', 2", in the direction of the outer-circumference periphery 15 of the latter, as far as a first diameter 12 of the friction disks 2', 2". Proceeding therefrom, two first further shorter webs 1c, which are offset in the circumferential direction in relation to the shorter web 1b within the cooling channel 20, extend further outward in the radial direction as far as the outer-circumference periphery 15, one offset to the left, and the other offset to the right. The first further shorter webs 1c divide up the cooling channels 20, in the radially outward direction from the relatively shorter web 1c, into three flow channels 1c', 1c", 1c'''. All the webs 1a, 1b, 1c have essentially the same web width and are rounded at the front and rear. The radially outer ends of the respective webs 1a, 1c here are located on the same circle circumference in the vicinity of the outer-circumference periphery 15, and the radially inner ends of the respective webs 1a are located on the same circle circumference in the vicinity of the inner-circumference periphery 14, of the brake disk 1. Moreover, starting from each of the relatively shorter webs 1b, the friction disk 2', which is directed toward the brake-disk hub 3, is extended in the radially inward direction and, level with the collar 3b of the brake-disk hub 3, is provided in the axial direction with a bore 21 which serves to accommodate the rivet 5, which fastens the friction disk 2' on the brake-disk hub 3. Closing heads 5"" of all the rivets 5 are located on the visible side of the fastening extension 9 of the friction disk 2', whereas the manufactured heads 5" of the rivets 5 are fully recessed in a planar depression 23 of the collar 3b of the brake-disk hub 3, as illustrated in FIG. 2. The friction disk 2', which is directed toward the brake-disk hub 3, likewise has an axially directed depression 27, which is intended for supporting the collar 3b of the brake-disk hub 3 and of which the internal diameter is greater than an external diameter of the collar 3b. Therefore, friction disk 2' and the brake-disk hub 3 are centered in relation to one another exclusively by way of the rivets 5. That side of the friction ring 2 which is directed toward the brake-disk hub 3 therefore has an axially directed depression 27, which is intended for accommodating the collar 3b of the brake-disk hub 3 and is configured such that an amount of radial play 25 is present between the radially-outward facing projections of brake-disk hub 3 and corresponding indents 30 of friction ring 2.

FIG. 3 shows a view of part of a rivet 5 designed in the form of semitubular rivets, measuring 5 mm×13 mm, with a manufactured head 5" and a stem 5'. In the direction of the manufactured head 5", the rivet stem 5' is designed to be conical with an increasing diameter. In the direction of the rivet stem 5', the manufactured head 5" has an undercut, and therefore the angle designated by a double arrow F measures essentially 88 degrees. The extent of a radius R between the cone 5''' of the rivet stem 5' and the undercut of the manufactured head 5" is not defined and is established by manufacturing. The cone 5''' has a length of at least 1.5 mm and at most 4 mm, the diameter of the cone 5''' at the manufactured head 5" being 5.33 mm. Tests have found that this rivet geometry, along with self-centering of the rivet during the operation of setting the rivet 5, results in an advantageous contact pattern with a 100% amount of contact, which gives rise to optimum centering and force transmission. In addition, the conical rivet stem 5' and the undercut F of the manufactured head 5" provide for perfect sealing of the rivet connection and, consequently, protection against corrosive media.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disk for a disk brake, comprising:
a brake-disk hub;
at least one friction ring;
axially directed rivets which connect the at least one friction ring to said brake-disk hub,
wherein
a lateral surface of the brake-disk hub is provided with reduced-wall-thickness portions and/or through-passages, which are axially directed material cutouts located on an outer circumference of the lateral surface of the brake-disk hub and serve for the at least partial placement of the axially directed rivets,
the at least one friction ring and the brake-disk hub are centered in relation to one another exclusively via the rivets,
the at least one friction ring has at least one fastening extension, which is directed inward from a friction surface of the at least one friction ring and to which a collar of the lateral surface of the brake-disk hub is connected by the axially directed rivets,
that side of the at least one friction ring which is directed towards the brake-disk hub has an axially directed depression, which is intended for accommodating the collar of the brake-disk hub and is configured such that an amount of radial play is present between the brake-disk hub and the at least one friction ring,
the inner diameter of the depression is greater than an outer diameter of the collar, and
the depression fully accommodates the collar of the brake-disc hub.

2. The brake disk as claimed in claim 1, wherein the supporting surface of the depression of the at least one friction ring has indents on its internal diameter, and a respective rivet is placed between said indents.

3. The brake disk as claimed in claim 2, wherein as seen in the radial direction, the indents have a maximum depth bounded by a reference circle of interconnected longitudinal axes of the axially directed rivets.

4. The brake disk as claimed in claim 3, wherein the axially directed rivets include eighteen rivets are arranged at regular spacing over the reference circle.

5. The brake disk as claimed in claim 1, wherein the brake disk is an internally ventilated brake disk having two adjacent friction disks which are connected to one another by radially running, regularly arranged webs, the webs run from an outer-circumference periphery as far as an inner-circumference periphery of the friction disks, and the latter are connected by the webs such that the interspaces thereof form identically sized cooling channels through which cooling air is flowable and which are subdivided by further, relatively shorter webs such that, in a radial region closer to the inner-circumference periphery of the friction disks, a respective relatively shorter web is located centrally between the webs, and the relatively shorter webs project radially inward beyond the webs and extend as far as the fastening extension, where, in alignment therewith in the radially inward direction, a respective rivet of the axially directed rivets connects the fastening extension to the collar.

6. The brake disk as claimed in claim 5, wherein directed radially outward from the relatively shorter web, the cooling channels divide up into at least three flow channels, two first further relatively shorter webs being arranged in each cooling channel, in a state in which they are offset radially outwards in relation to each relatively shorter web in the circumferential direction.

7. The brake disk as claimed in claim 1, wherein the brake disk, which is directed towards the brake-disk hub, is extended inwards in the direction of the fastening extension.

8. The brake disk as claimed in claim 1, wherein the internal diameter of the depression is greater than an external diameter of the collar, and therefore the friction ring and the brake-disk hub are centered in relation to one another exclusively via the rivets.

9. The brake disk as claimed in claim 8, wherein the depression fully accommodates the collar of the brake-disk hub.

10. The brake disk as claimed in claim 1, further comprising:
for each of the axially directed rivets, a bore for accommodating a respective rivet of the axially directed rivets in the collar of the brake-disk hub, said bore corresponding to a bore in the fastening extension for accommodating the respective rivet, having a planar depression at its end which is directed away from the at least one friction ring, said planar depression serving to accommodate a manufactured head of the respective rivet at least to some extent.

11. The brake disk as claimed in claim 10, wherein the planar depression of the collar of the brake-disk hub fully accommodates the manufactured head of the respective rivet.

12. The brake disk as claimed in claim 1, wherein a transition from a rivet stem to a manufactured head of each of the axially directed rivets is provided with an axial undercut on each manufactured head.

13. The brake disk as claimed in claim 1, wherein starting from a manufactured head of each of the axially directed rivets, prior to being deformed a diameter of a conical portion of a rivet stem of each of the axially directed rivets decreases in the direction of a rivet-closing head of each of the axially directed rivets.

14. The brake disk as claimed in claim 1, wherein the brake-disk hub is made of light metal, steel or a non-metal material.

15. The brake disk as claimed in claim 1, wherein the brake-disk hub and the at least one friction ring are connected to one another by orbital riveting.

16. The brake disk as claimed in claim 1, wherein the rivets are made of an austenitic, stainless steel.

* * * * *